Patented Feb. 15, 1938

2,108,126

UNITED STATES PATENT OFFICE 2,108,126

AZO-DYESTUFFS OF THE ANTHRAQUINONE SERIES

Ernst Honold, Frankfort-on-the-Main-Fechenheim, and Carl Taube, Wiesdorf, near Cologne-on-the-Rhine, Germany, assignors to General Aniline Works, Inc., New York, N. Y., a corporation of Delaware No Drawing. Application October 21, 1936, Serial No. 106,830. In Germany October 23, 1935

4 Claims. (Cl. 260—56.5)

This invention relates to valuable new azo dyestuffs, more particularly to those of the general formula:

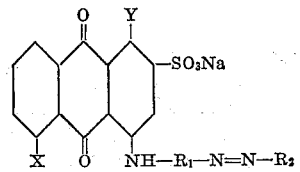

wherein X stands for a member selected from the group consisting of hydrogen and acylamino, Y stands for a member selected from the group consisting of —$NH_2$ and —OH, $R_1$ stands for a radicle selected from the group consisting of the benzene and phenyl-pyrazolone series, $R_2$ means a radicle of the benzene series and $R_1$ and $R_2$ contain at least one member selected from the group consisting of hydrogen, —$SO_3Na$ and —COONa.

The new dyestuffs are obtained by condensing 1-amino-4-halogeno-anthraquinone-2-sulfonic acids or 1-hydroxy-4-halogenoanthraquinone-2-sulfonic acids or the substituted derivatives thereof with aminoazo compounds of the general formula:

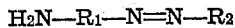

wherein $R_1$ and $R_2$ have the above significance. Particularly useful are aminoazo compounds of this general formula which contain one or more groups inducing solubility in water such as for example the carboxyl group or the sufonic acid group.

Advantageously the condensation is performed in an aqueous medium or, when employing compounds which are only slightly soluble in water, in a mixture of water and alcohol. It is surprising that the said aminoazo compounds can be condensed with 1-amino- or 1-hydroxy-4-halogeno-anthraquinone-2-sulfonic acids, in spite of the fact that they contain the negative azo group and, possibly, a further strongly negative group such as the sulfonic acid group.

The new dyestuffs thus obtained possess a particularly great affinity for animal fibers which are dyed from an acid bath olive-green to green shades of excellent fastness. Moreover the new products possess an affinity for cotton which is quite considerable in some cases, and some of them are valuable intermediates for the manufacture of other dyestuffs.

The following examples illustrate, but do not limit the invention, the parts being by weight.

Example 1

45 parts of the sodium salt of 1-amino-4-bromo-anthraquinone-2-sulfonic acid and 35 parts of the sodium salt of 4-amino-azobenzene-4'-sulfonic acid are dissolved in about 2000 parts of water, 20 parts of sodium bicarbonate and 1 part of cuprous chloride are added and the mixture is heated to about 80–90° C. for about 10 hours while stirring. Then the solution is filtered while hot and the condensation product formed is isolated from the filtrate by the addition of sodium chloride. It is dissolved in hot water in order to remove unaltered initial materials, the dyestuff is precipitated by the addition of concentrated hydrochloric acid, filtered off and washed with dilute hydrochloric acid. Then the dyestuff is dissolved once more in water with addition of sodium carbonate, precipitated from this solution by the addition of sodium chloride, filtered off and dried. It is a greenish black powder, soluble in concentrated sulfuric acid with a violet color, dyeing wool from an acid bath very fast olive-green shades. The new dyestuff corresponds to the formula:

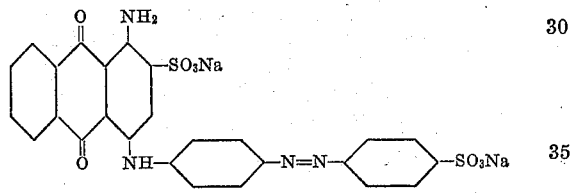

Example 2

45 parts of the sodium salt of 1-amino-4-bromo-anthraquinone-2-sulfonic acid are dissolved in about 1000 parts of water. 20 parts of sodium bicarbonate, 1 part of cuprous chloride and the solution of 25 parts of 4-amino-azobenzene in about 800 parts of alcohol are added and the mixture is heated to boiling for about 12 hours in an apparatus provided with a reflux condenser and a stirrer. Then the alcohol is distilled off, the solution is filtered and from the filtrate the condensation product formed is isolated by the addition of sodium chloride. It is dissolved in water, precipitated by the addition of hydrochloric acid while hot and the precipitate is filtered off and washed with dilute hydrochloric acid. Then the condensation product obtained of the formula:

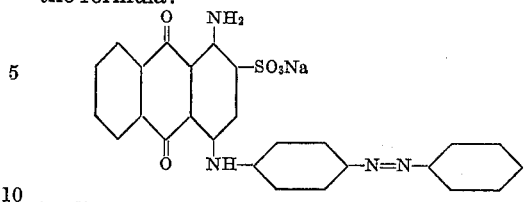

is dissolved in alcohol and precipitated by the addition of cold water. When dry it is a greenish black powder, soluble in concentrated sulfuric acid with an olive color and in sulfuric acid of 85 per cent $H_2SO_4$ with a reddish violet color.

Example 3

45 parts of the sodium salt of 1-amino-4-bromo-anthraquinone-2-sulfonic acid are condensed with 35 parts of the sodium salt of 4-amino-2-methyl-azobenzene-4'-sulfonic acid in the same manner as described in Example 1. The dyestuff obtained of the formula:

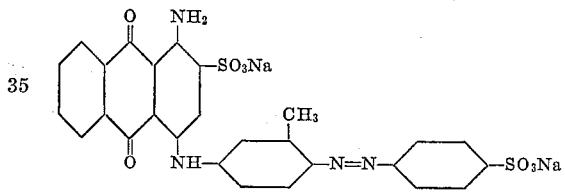

may also be purified as described in Example 1. It is when dry a greenish black powder, soluble in concentrated sulfuric acid with a red color, dyeing wool more yellowish olive-green shades of good fastness properties.

Example 4

45 parts of the sodium salt of 1-amino-4-bromo-anthraquinone-2-sulfonic acid and 40 parts of the sodium salt of 4-amino-3-methoxy-6-methyl-azobenzene-2'-sulfonic acid are condensed in the same manner as described in Example 1. The condensation product obtained of the formula:

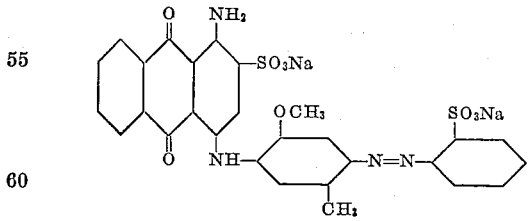

is easily purified by dissolving in water and precipitating by means of hydrochloric acid. The soduim salt of the new dyestuff represents when dry a greenish black powder, soluble in concentrated sulfuric acid with a bluish color and in water with an olive-green color. It dyes wool fast olive-green shades.

Example 5

50 parts of the sodium salt of 1-amino-4-bromo-5-methoxy-acetylamino-anthraquinone-2-sulfonic acid and 30 parts of the sodium salt of 4-amino-2-methyl-azobenzene-4'-carboxylic acid are dissolved in about 1000 parts of water, 20 parts of sodium bicarbonate and 0.5 part of cuprous chloride are added and the mixture is heated to about 90 to 100° C. for some hours while stirring. Then the solution is filtered and from the filtrate the condensation product formed is isolated by the addition of sodium chloride. It is purified by dissolving in water and precipitating by means of hydrochloric acid. Then it is dissolved in water again with addition of sodium carbonate and the sodium salt of the new dyestuff of the formula:

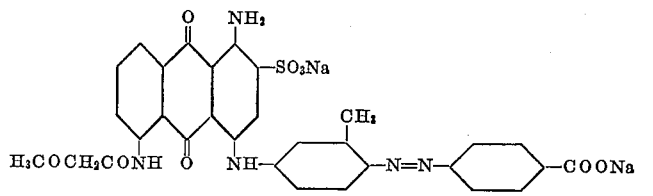

is isolated by the addition of soduim chloride. It is when dry a greenish black powder, soluble in concentrated sulfuric acid with a red (dichroic:blue) color and in water with an olive-green color, dyeing wool fast olive-green shades.

Similar dyestuffs are obtained by starting from 1-amino-4-bromo-anthraquinone-2-sulfonic acids which contain other acylamino-groups in the 5-position of the anthraquinone nucleus.

By employing 45 parts of the sodium salt of 1-amino-4-bromo-anthraquinone-2-sulfonic acid instead of the sodium salt of 1-amino-4-bromo-5-methoxyacetylamino-anthraquinone-2-sulfonic-acid in the above example a similar dyestuff is obtained which may be purified in the same manner as above described. It is when dry a greenish black powder, soluble in concentrated sulfuric acid with a red (dichroic:blue) color, dyeing wool fast olive-green shades.

Example 6

45 parts of the sodium salt of 1-amino-4-bromo-anthraquinone-2-sulfonic acid and the aminoazo dyestuff which is obtained by combining the diazo compound of 40 parts of 1-aminobenzene-2,4-disulfonic acid with the corresponding amount of 1-(3'-aminophenyl)-3-methyl-pyrazolone in an aqueous solution containing an excess of sodium carbonate are dissolved in about 2200 parts of water. 75 parts of sodium carbonate and 1 part of cuprous chloride are added and the mixture is heated to boiling for about 3 hours in an apparatus provided with a reflux condenser and a stirrer. Acetic acid is added when cool, and the precipitate formed is filtered off, dissolved in a dilute solution of sodium carbonate and precipitated therefrom by the addition of sodium chloride. The dyestuff thus obtained of the formula:

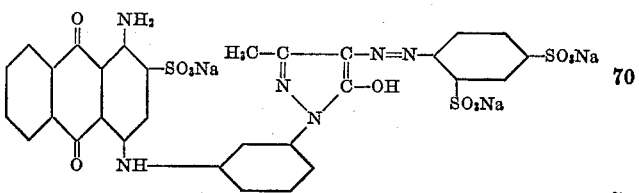

is when dry a dark powder, dyeing wool fast bluish green shades.

Example 7

45 parts of the sodium salt of 1-amino-4-bromo-anthraquinone-2-sulfonic acid are condensed with 35 parts of 4-aminoazobenzene-4'-carboxylic acid in an aqueous solution in the presence of 25 parts of sodium carbonate and 2 parts of cuprous chloride by heating to about 90 to 100° C. for some hours. The dyestuff formed of the formula:

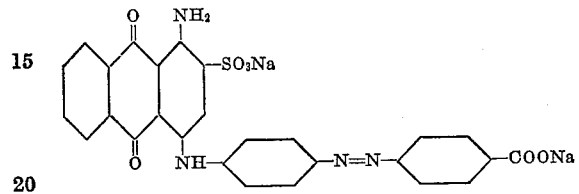

is isolated and purified as described in Example 1. It is when dry a greenish black powder, soluble in concentrated sulfuric acid with a violet color which is changed to olive-green by the addition of paraformaldehyde. The new dyestuff dyes wool from an acid bath very fast green shades.

Example 8

By employing instead of the 4-amino-azobenzene-4'-carboxylic acid in Example 7 the same amount of 4-amino-azobenzene-3'-carboxylic acid and proceeding as described in Example 7 a dyestuff of the formula:

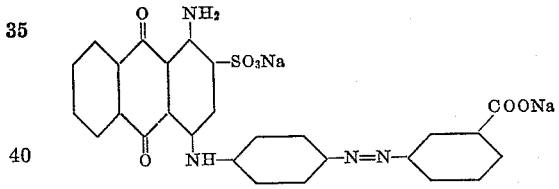

is obtained, which is when dry a greenish black powder. It disolves in concentrated sulfuric acid with a reddish violet color which is changed to green by the addition of paraformaldehyde. The new dyestuff dyes wool from an acid bath very fast green shades.

Example 9

38 parts of the copper salt of 1-hydroxy-4-bromo-anthraquinone-2-sulfonic acid, 30 parts of the sodium salt of 4-amino-azobenzene-4'-sulfonic acid, 20 parts of sodium carbonate and about 1000 parts of water are mixed and the mixture is heated to about 90 to 100° C. for about 12 hours while stirring. The slightly soluble copper salt of the condensation product formed precipitates from the solution. It is filtered off and washed, then dissolved in boiling water by means of hydrochloric acid. From this solution the condensation product is isolated by the addition of sodium chloride. It is filtered off, washed and further purified by dissolving in water and precipitating by means of ammonia. Then the new dyestuff is filtered off, washed and dried. It corresponds to the formula:

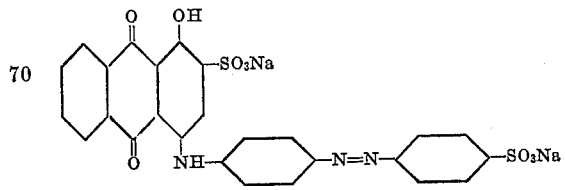

and is a greenish black-powder, soluble in concentrated sulfuric acid with a blue color which is changed to olive-green by the addition of paraformaldehyde. The dyestuff dyes wool from an acid bath very fast grayish olive shades turning to olive-green of good fastness to fulling and potting when converting the dyestuff into its chromium complex compound.

By employing 2-methyl-4-amino-5-methoxy-benzene-azo-4'-ethoxybenzene-2'-sulfonic acid instead of the 4-amino-azobenzene-4'-sulfonic acid in the above example a dyestuff is obtained which dyes wool very fast olive shades. When the dyestuff is converted into its chromium complex compound olive shades of good fastness to fulling and potting are obtained.

By condensing 1-hydroxy-4-bromo-anthraquinone-2-sulfonic acid with 3-methoxy-4-amino-azobenzene-3'-sulfonic acid a dyestuff is obtained which dissolves in concentrated sulfuric acid with a blue color turning to olive-green by the addition of paraformaldehyde. The dyestuff dyes wool from an acid bath yellowish olive shades turning to more yellowish olive of excellent fastness properties when converting the dyestuff into its chromium complex compound.

We claim:

1. The monoazo dyestuffs of the general formula:

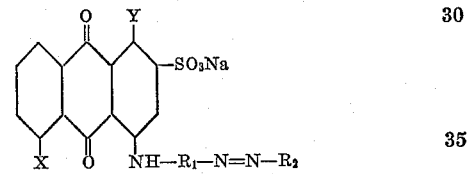

wherein X stands for a member selected from the group consisting of hydrogen and acylamino, Y stands for a member selected from the group consisting of —$NH_2$ and —OH, $R_1$ stands for a radicle selected from the group consisting of the benzene and phenyl-pyrazolone series, $R_2$ means a radicle of the benzene series and $R_1$ and $R_2$ contain at least one member selected from the group consisting of hydrogen, —$SO_3Na$ and —$COONa$, which dyestuffs dye wool from an acid bath olive-green to green shades of excellent fastness and possess affinity to cotton too.

2. The monoazo dyestuff of the formula:

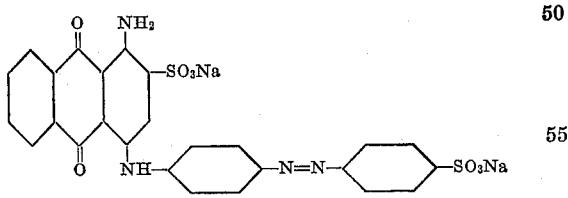

which dyestuff is a greenish black powder, soluble in concentrated sulfuric acid with a violet color, dyeing wool from an acid bath very fast olive-green shades.

3. The monoazo dyestuff of the formula:

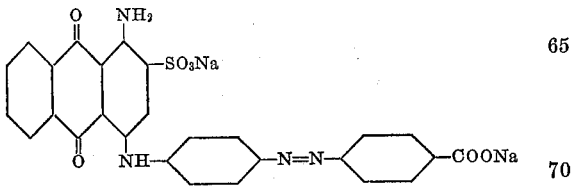

which dyestuff is a greenish black powder, soluble in concentrated sulfuric acid with a violet color, dyeing wool from an acid bath very fast green shades.

4. The monoazo dyestuff of the formula:
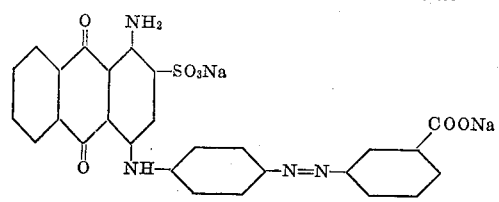
which dyestuff is a greenish black powder, soluble in concentrated sulfuric acid with a reddish violet color, dyeing wool from an acid bath very fast green shades.
ERNST HONOLD.
CARL TAUBE.